Aug. 10, 1965  J. J. O'MALLEY ETAL  3,199,374
DRIVE SUSTAINING DEVICE
Filed April 12, 1961  2 Sheets-Sheet 1

INVENTORS
John J. O'Malley,
Robert L. Black,
& Thomas R. Zimmer
BY
Hugh L. Fisher
ATTORNEY Aug. 10, 1965  J. J. O'MALLEY ETAL  3,199,374
DRIVE SUSTAINING DEVICE Filed April 12, 1961  2 Sheets-Sheet 2

INVENTORS
John J. O'Malley,
Robert L. Black,
BY & Thomas R. Zimmer

Hugh L. Fisher
ATTORNEY

United States Patent Office 3,199,374
Patented Aug. 10, 1965

3,199,374
DRIVE SUSTAINING DEVICE
John J. O'Malley, Livonia, Robert L. Black, Allen Park, and Thomas R. Zimmer, Livonia, Mich., assignors to General Motors Corporation, Detroit, Mich., a corporation of Delaware
Filed Apr. 12, 1961, Ser. No. 102,453
31 Claims. (Cl. 74—688)

This invention relates in general to drive sustaining devices of the type capable of serving as either a brake or a clutch in power transmission equipment.

In order to exemplify the problem with which the invention is concerned, the specific example of an automatic vehicle transmission employing planetary gearing and a fluid coupling will be assumed. Further, it is assumed that a friction brake is utilized by the transmission for establishing Forward Drive, and it, for demonstration purposes, restrains rotation of a reaction gear through the intermediary of a one-way device. With this type of forward brake, the one-way device will automatically assume or release the torque load smoothly and gradually during a ratio change due to the presence of the fluid coupling in the drive train, the result being a very desirable cushioning effect that renders any transition involving the forward brake relatively unnoticeable to the driver of the vehicle. This, of course, also eliminates the need for any complex calibration provision normally needed for producing an equivalent smooth and gradual transition between different drive ratios. In other words, the timing of the engagement and the disengagement of the friction devices determining a ratio change is automatic.

Such a forward brake incorporating a one-way device does automatically release or engage as the reaction load changes during a ratio change and does achieve smoothness but does have objectionable aspects. First, the one-way device is only operative in one direction, and that would be the normal Forward Drive direction. If the vehicle should commence to coast, then the one-way device will release with the result that a free-wheeling condition exists and the braking inherently available from the engine is lost. To remedy this condition it is necessary to apply another brake, e.g., a band, that will restrain the reaction gear from rotation in either direction and therefore take care of this coast drive condition. A second objection is that this type of forward brake, since it requires a one-way device, involves a large number of expensive parts that must be accurately machined in order to avoid a malfunction. For instance, one-way devices often fail because some of the elements do not assume their proportionate share of the load. Third, the one-way device only performs as an intermediary between the reaction gear and the disk brake, and therefore in no way contributes to the potential capacity of the brake. But, in fact, both the brake and the one-way device must each have the capacity to handle the maximum load expected. Fourth, the one-way device cannot conveniently be placed above or below a unit but generally be placed beside the unit and hence requires valuable axial space.

Accordingly, the invention contemplates a new and different friction device for overcoming the foregoing disadvantages, one that automatically compensates for varying torque loads assumed thereby so as to always engage and disengage at optimum rates for the loads assumed; that is capable of assuming negative and positive torque loads; that can assume greater torque loads while consuming less axial space; and that utilizes fewer and less expensive parts.

Another purpose of the invention is to provide a friction device that is self energized so as to sustain a torque load in one direction without an external force. Also, a purpose is to render the device capable of sustaining torque in either direction by the addition of a minimum additional force that can serve additionally as a "tickling" or operation initiating force.

Other features of the invention include the adaptability of the friction device for use in automatic vehicle transmissions since no timing problem is presented in achieving transitions from one drive ratio to another and because a separate coast brake, commonly required when a one-way device is employed, is not needed for preventing free-wheeling during coast.

More specifically, the invention combines a disk type friction device with an energizing arrangement in a unique way to obtain optimum performance under varying conditions. Pressure operation according to the invention permits a true Neutral to be obtained at any time, and also allows the extent of energization to be changed if desired.

The foregoing and other objects and advantages of the invention will become apparent from the following description and from the accompanying drawings in which.

Figure 1:
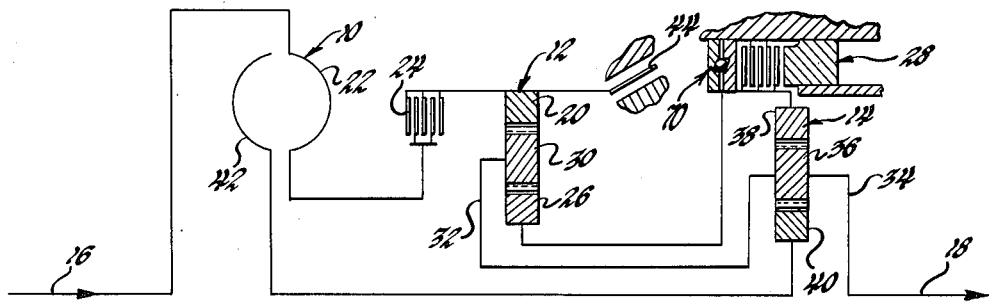
FIGURE 1 is a schematic diagram of a transmission incorporating the invention.

Referring to the drawings in detail, and initially to FIGURE 1, the transmission illustrated includes a fluid coupling 10 and front and rear planetary gear units 12 and 14 all interposed between an engine connected input shaft 16 and an output shaft 18 that is drive connected to the wheels of a vehicle in any known way. The transmission is similar to one disclosed in the U.S. application Serial No. 754,089 to Herndon et al., filed August 8, 1958, now Patent No. 3,159,051 issued Dec. 1, 1964 and entitled Transmission, and is capable of providing three Forward Drive ratios and a Reverse Drive ratio as will become evident. Since this prior application presents a complete description of the FIGURE 1 transmission, this explanation will be detailed only to the extent necessary for understanding the principles of the invention.

Describing now the gear units 12 and 14, in the front unit 12, a ring gear 20, the input for the front unit 12, is as will be apparent joined to an impeller 22 for the coupling 10 by a second speed clutch 24. Reaction for the unit 12 is obtained by holding a sun gear 26 with a friction device denoted generally at 28. A series of planet pinions 30 intermesh with the ring and sun gears 20 and 26 and are journaled on an output planet carrier 32.

The output planet carrier 32 for the front unit 12 is drive connected to an output planet carrier 34 for the rear unit 14 and carrier 34 is in turn drive connected to the output shaft 18. Revolvably supported on the rear unit carrier 34 are a series of planet pinions 36 each of which meshes with a reaction ring gear 38 and an input sun gear 40 for the rear unit 14. The reaction ring gear 38 is restrained from rotation when reaction is desired by the friction device 28 in the same manner as the reaction sun gear 26 for the front unit 12. The input sun gear 40 receives drive from a turbine 42 for the coupling 10.

In operation and considering the various conditions for the transmission, a true Neutral is obtainable, even though the coupling 10 is filled, merely by releasing the friction device 28. As a consequence, the rear unit 14 has no reaction element and is therefore incapable of transferring drive either from the input shaft 16 to the output shaft 18 or from the output shaft 18 to the input shaft 16, the latter of which occurs during coast drive. This, of course, is very desirable for the inertia of certain parts of a transmission, unless there is a true Neutral, can inherently produce creeping movement of the vehicle. In Neutral, therefore, the coupling 10 can be filled since the friction device 28 is disengaged.

To commence Forward Drive in the first drive ratio, i.e., the ratio affording the greatest engine torque multiplication, the friction device 28 is engaged, whereupon the rear unit 14 will become effective, drive proceeding from the coupling 10 to the input sun gear 40. This drive will attempt to revolve the reaction ring gear 38 backwards, but this tendency will be restrained by the friction device 28. Hence, the pinions 36 will travel around the stationary ring gear 38 in a direction that causes the output planet carrier 34 to have a positive forward driving torque imposed thereon.

For the second speed to be established, the coupling 10 must be drained and the second speed clutch 24 engaged. The draining of the coupling 10 terminates drive to the input sun gear 40 for the rear unit 14 but the direct connection made by the second speed clutch 24 to the input shaft 16 via the coupling impeller 22 causes drive now to be delivered to the input ring gear 20 for the front unit 12. This drive attempts to revolve the front unit reaction sun gear 26 backwards but again the friction device 28 prevents it so that the front unit output carrier 32 is driven forwardly at a speed determined by the ratio of the front unit 12.

Third speed merely requires that the coupling 10 be filled and this produces a substantially direct drive; a slight slip in the coupling 10 prevents a true lockup from being attained. In third speed, the drive is as before directly from the input shaft 16 to the input ring gear 20 for the front unit 12. Drive is also transferred to the rear unit input sun gear 40 via the coupling 10. Since both the inputs to the front and rear gear units 12 and 14 are rotated at substantially the same speed, and since the friction device 28 will have been released as will be explained, both the front and rear gear units 12 and 14 will become locked up for what can be considered a unitary drive.

A Reverse Drive ratio requires that the friction device 28 be disengaged as well as the second speed clutch 24, the coupling 10 be filled, and that a reverse brake 44 be engaged so as to prevent the front unit input ring gear 20 from rotating. With these conditions, drive is transferred from the input shaft 16 through the coupling 10 to the rear unit input sun gear 40. Since there is no restraint against backward rotation of the rear unit reaction ring gear 38, it will cause the front unit reaction sun gear 26 to be revolved backwardly, whereupon the front unit output planet carrier 32 will be caused to rotate also rearwardly due to the reaction furnished by the gear 20 now held by the reverse brake 44. This will impose a negative or reverse torque on the output shaft 18 and afford a Reverse Drive ratio that is determined by the compounding of the ratios from both the front and rear gear units 12 and 14.

Figure 2:
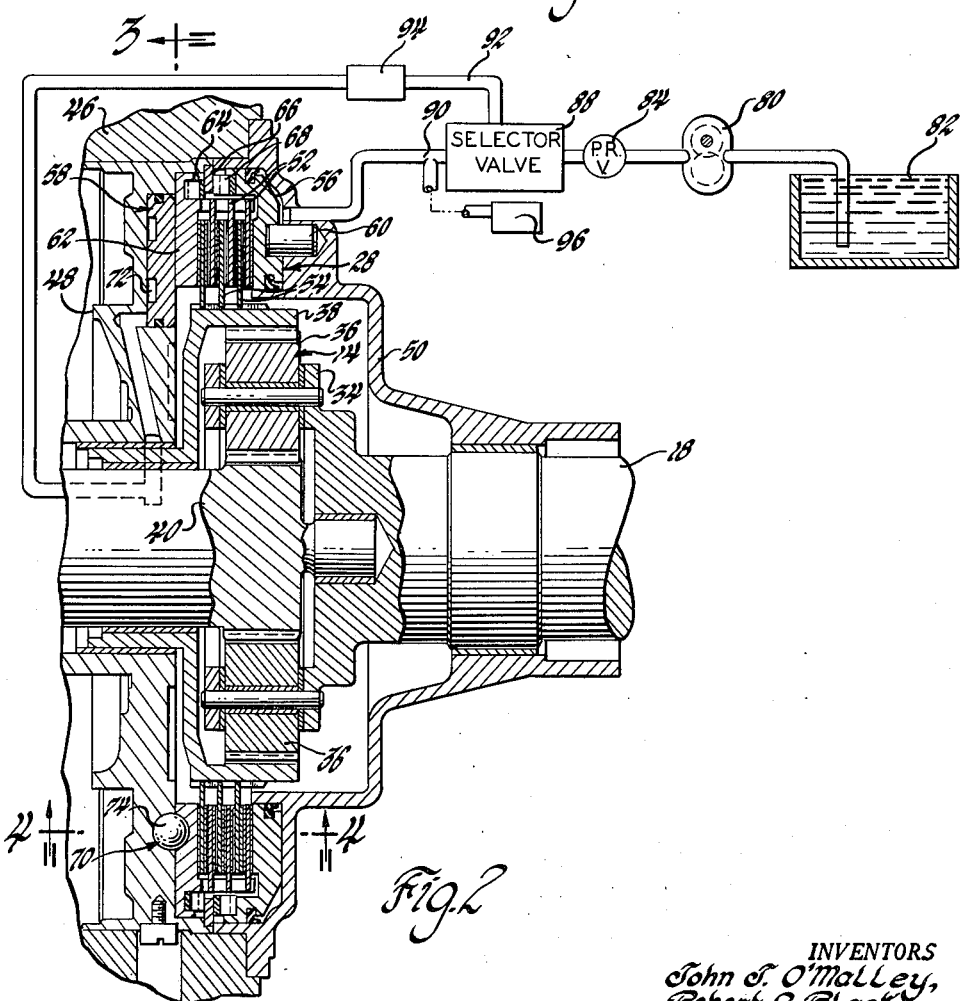
FIGURE 2 is a sectional view of a disk brake employed by the transmission and a schematic showing of a fluid pressure system for the brake.

The friction device 28 shown in detail in FIGURE 2 is, as mentioned, disengaged to afford a true Neutral through the transmission and is engaged to furnish reaction for the front and rear gear units 12 and 14. The device 28 as illustrated is housed within a transmission casing 46 between a center support 48, which is axially and rotationally fixed to the casing 46, and a rear bearing retainer 50. A series of friction elements such as stator plates or disks 52 and rotor plates or disks 54 are interleaved between a reaction piston 56 and an energizing mechanism shown generally at 58. The reaction piston 56 is slidably contained within the rear bearing retainer 50 and prevented from rotation by a fixed dowel 60. The rotor disks 54 are splined or otherwise drive connected to the rear unit reaction ring gear 38, whereas the stator disks 52 are splined or otherwise connected to an axially movable annular backing plate 62 contained within the center support 48.

The backing plate 62 forms a part of the energizing mechanism 58 and is axially urged to the FIGURE 2 position by a spring 64 of the wave type. The spring 64 abuts against a center ring 66 interposed between the center support 48 and the rear bearing retainer 50. The center ring 66 also affords an abutment for a spring 68 that urges the reaction piston 56 to the depicted disengaged position and additionally serves to limit the travel of either or both the reaction piston 56 and the backing plate 62.

Figure 3:
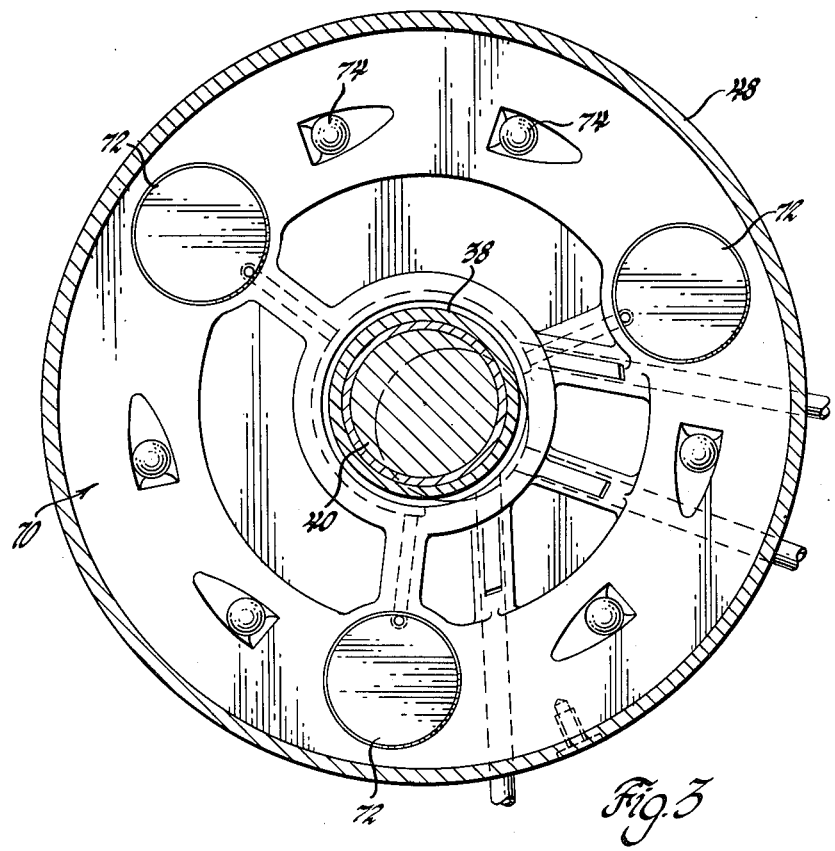
FIGURE 3 is a further sectional view of the brake taken along line 3—3 of FIGURE 2.

The energizing mechanism 58 further includes a cam device denoted generally by the numeral 70 and a series of energizing pistons 72 enclosed within accommodating recesses formed in the center support 48 as seen in FIGURE 3. Together the cam device 70 and the energizing pistons 72 urge the backing plate 62 to a position in which the friction device 28 becomes engaged. The number of energizing pistons 72 used will be determined by the force required.

Figure 4:
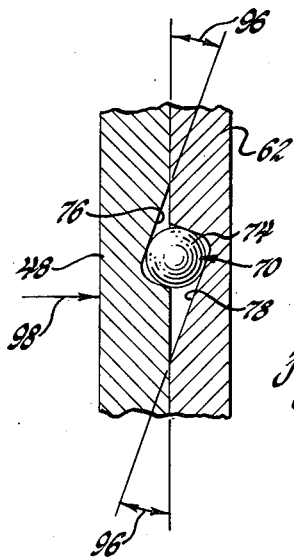
FIGURE 4 is a partial sectional view of another part of the brake taken along line 4—4 of FIGURE 2.

In describing the cam device 70, reference is particularly made to FIGURES 2, 3, and 4 for, as shown there, a series of cam elements as balls 74 are contained within opposed and tapered recesses or pockets 76 and 78 formed at circumferentially spaced intervals respectively in the center support 48 and the backing plate 62, each of which performs as a race. As can be observed in FIGURE 4, displacement of the plate 62 relative to the center support 48 will, due to the camming action of the balls 74 in the pockets 76 and 78, cause an axial shifting of the backing plate 62 relative to the center support 48. This, as will be explained, produces the actual engagement of the friction device 28.

The control system for the FIGURE 1 transmission has been considerably simplified since only that part relating to the friction device 28 is of significance relative to the invention. The control system employs a pump 80 that is revolved by a part of the transmission at some selected speed, e.g., the input shaft 16, and that in a known way withdraws fluid from a sump 82 and delivers the fluid under pressure to output side of the pump 80. In the output of the pump 80 a suitable pressure regulator valve 84 may be installed to maintain the pressure at some desired level. Fluid pressure at this level is then delivered to a selector valve 88 that can be manually adjusted in a known way to establish the selected transmission statuses. Thereafter, fluid pressure is delivered via a reaction piston supply line 90 to the reaction piston 56. Also, depending on the position of the selector valve 88, fluid pressure is supplied via an energizing piston supply line 92 and through a suitable 2–3 shift valve 94 to the energizing pistons 72. The shift valve 94 is of the type that permits this communication between the pump 80 and the energizing pistons 72 only in the downshift position.

In describing the operation of the friction device 28, the FIGURE 1 transmission is referred to in order to facilitate a clearer understanding, but it should be kept in mind that the friction device 28 can be used in other transmissions and for other purposes. When used in the FIGURE 1 transmission, the friction device 28 as explained is disengaged in Neutral and Reverse and is engaged in Forward Drive except in third speed. The determination of whether the friction device 28 is engaged, of course, is established by the manipulation of the selector valve 88 by the operator. If the selector valve 88 is placed in either the Neutral or Reverse settings, fluid pressure is not supplied to the reaction piston supply line 90 and may not be supplied to the energizing pistons supply line 92 as will become more evident.

In Forward Drive, fluid under pressure is supplied via the selector valve 88 to both the lines 90 and 92. As a consequence, the reaction piston 56 is moved the extent permitted by the center ring 66, but this alone will not engage the friction device 28 since the piston 56 only serves as a reaction member. The fluid pressure delivered by the line 92 through the 2-3 shift valve 94 and to the energizing pistons 72 will initiate operation of the energizing mechanism 58 and thereby commence moving the backing plate 62 towards the engaged position, i.e., a position in which the rotor and stator disks 54 and 52 are compressed against the face of the reaction piston 56. This initiation of movement of the backing plate 62 brings into immediate effect the cam device 70 since the initial engagement of the backing plate 62 with the closest adjacent rotor disk 54 will produce a slight rotational movement of the plate 62. It is mentioned here that this first compression of the disks 52 and 54 is adequate for the device 28 to assume torque and constitute a "tickling force." Although fluid pressure is utilized to provide the "tickling force," other arrangements can be employed, e.g., energizing springs could offer the required force. Since the movement of the backing plate 62 will be relative to the fixed center support 48, the balls 74 will become operative and the resultant camming action from the inclines on the pockets 76 and 78 will produce axial displacement of the backing plate 62 of an amount that is a function of the reaction load. In other words, if the reaction load reduces, the apply force from the cam device 70 will be correspondingly less.

It should be noted that this energization initiating or "tickling" force from the energizing pistons 72 can be varied to meet the demands of a particular application. In this embodiment, the force contributed by the fluid pressure acting on the energizing pistons 72 is adequate to maintain the cam device 70 engaged even though there is a reversal of torque. In this way, and now referring to the FIGURE 1 transmission, if the output shaft 18 commences to drive in either first or second speed, the reaction ring gear 38 and the reaction sun gear 26 will be caused to tend to revolve in an opposite direction and, if permitted, vehicle free-wheeling could occur there being no connection with the input shaft 16. But because the cam device 70 is maintained engaged, this cannot happen and the reaction gears 26 and 38 still perform their reaction functions. If there was no concern for this coast drive aspect, the cam device 70 could be permitted to disengage on a torque reversal by reducing or eliminating the force contributed by the fluid pressure on the energizing pistons 72. Then, when the transmission shifted to third speed, the friction device 28 would not have to be disengaged. Also, if energizing springs were used as suggested, they could be made to hold coast torque as well as affor the "tickling force."

Another aspect of this energization is that a so-called full energization is utilized. To explain further, in this embodiment by utilizing full energization, the fluid pressure acting on the energizing pistons 72 and supplied thereto by the supply line 92 can be eliminated once the cam device 70 is engaged, e.g., by moving the selector valve 88 in a known way, and the cam device 70 will remain engaged as long as the torque load is not removed or does not change directions. This is because the tangential component of the axial force acting on the cam device 70 is sufficient to maintain the relative positions of the pockets 76 and 78. Of course, once the reaction load is entirely removed, or the load reverses from, e.g., a positive to a negative load, a full and complete disengagement will take place.

Figure 5:
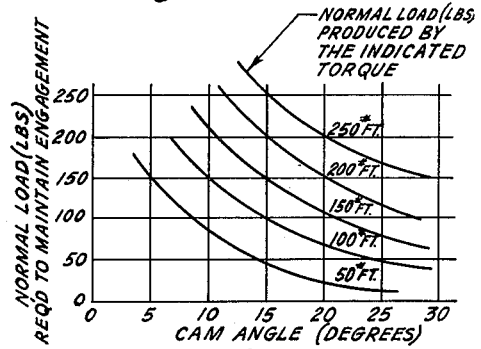
FIGURE 5 is a graph demonstrating the self-energization aspect of the invention.

To obtain full energization the cam angles 96 of the pockets 76 and 78 shown in FIGURE 4 must be equal to or less than the self energizing angles (a), which is determined by the following equation:

$$\tan. a = \frac{N_E f r}{R_B}$$

where $a$ = self-energizing angle
$N_E$ = number of disk friction surfaces
$f$ = coefficient of friction of the friction surfaces
$r$ = mean radius of disks 52 and 54
$R_B$ = radius at which the balls operate This is best understood by referring to the graph in FIGURE 5; for if a 50 lb. normal load in the direction of arrow 98 in FIGURE 4 is required to maintain the disks 52 and 54 engaged and a 50 lb. ft. torque is being applied, the cam angles 96 employed must be 15° or less, the 15° representing the self energizing angle. In other words, if the cam angle 96 is greater than 15°, the normal load produced by 50 lb. ft. of torque will, as the graph indicates, be less than the 50 lb. required normal load, and the disks 52 and 54 will slip unless the normal load is supplemented in some way. Any cam angle less than 15° will produce a normal load greater than that required as shown by the upswinging curve and of course, no supplemental or external forces are demanded, there being full energization. The same applies to the other curves of 100, 150, 200 and 250 lb. ft., if 15° is the selected self energizing angle, because the resultant normal load will be equal to or greater than the required normal load as long as the cam angle is 15° or less. These curves likewise swing upwardly at 15° where the resultant normal load is equivalent to the required normal load indicating that the resultant normal load becomes more than adequate as the cam angle is decreased.

The upshift to third speed in the FIGURE 1 transmission requires that the friction device 28 be disengaged unless, as suggested, fluid pressure acting on the energizing pistons 72 is or has been removed. Hence, as a part of the ratio change, the 2-3 shift valve 94 is arranged so as to interrupt the supply of fluid pressure to the energizing pistons 72 whenever the valve 94 is moved to the upshift position. Upon upshift, a reversal of rotation takes place since the reaction gears 26 and 38 will be revolved forwardly; hence, the cam device 70 will disengage.

The ratio change timing feature of the friction device 28 can now be demonstrated since in going from second speed to third speed the friction device 28 is disengaged and the coupling 10 filled. The rate at which the cam device 70 disengages or releases its load will be determined by how rapidly the coupling 10 is filled. Likewise, on a third speed to second speed shift, when the friction device 28 is applied and the coupling 10 emptied, once again, the friction device 28 will assume the reaction load as quickly as the coupling 10 drains and gives up its torque transmitting capacity. Consequently, with either transition, the friction device 28 automatically times the shift assuming or releasing the reaction load as quickly as needed and as determined by the emptying and filling of the coupling 10. This alleviates any need for providing a complex control system for producing the proper overlap between the units during the ratio change and enables the friction device 28 to improve the results obtainable with the more complex arrangement wherein a one-way device acts between the brake and one of the reaction gears.

The application of fluid pressure to the reaction piston 56 permits as suggested the attainment of a true Neutral through the transmission merely by movement of the selector valve 88 to the Neutral setting by the operator. In this way, when the vehicle is proceeding in second speed and for some reason Neutral is desired, the removal of fluid pressure from the reaction piston 56 will completely deactivate the friction device 28 thereby affording the operator with the availability of this safety feature should the occasion arise.

If this feature was not needed, the backing plate 62 could be connected directly to the transmission casing 46. The disks 52 and 54 and the reaction piston 56 could then be eliminated. Moreover, in another form of drive sustaining device the energizing mechanism 58 could be employed to engage a clutch instead of operating a brake. Merely by providing an initiating force, the application of a torque from an input to the now revolvable support 48 will force the plate 62 to shift axially and engage the clutch.

Additionally, the application of fluid pressure to the reaction piston 56 enables manual shifts from Neutral to Forward Drive and from Neutral to Reverse Drive to take place in such a way that neither will produce an undesirable jar to the driver. One way of accomplishing this would be to install an accumulator 96 in the line 90 such that whenever fluid pressure was transferred to the line 90 by movement of the selector valve 88 to either the Forward Drive or Reverse Drive setting, the fluid pressure furnished to reaction piston 56 could not build up rapidly enough to produce this undesirable jar due to the need to first fill the accumulator 96 at some predetermined rate.

From the foregoing, it can be appreciated that the friction device 28 disclosed is quite compact and requires only a minimum number of parts. Of special significance is the elimination of need for a one-way device which, in itself, requires numerous parts and because of their precision requirements are costly. Instead, the friction device 28 employs a cam device 70 that not only eliminates the need for a coast drive brake but supplements the over-all capacity of the friction device 28 because of the energization afforded, and furthermore, promotes the smooth and gradual transition from one ratio to another in desirable and multi-step ratio transmission. Also, the friction device 28 can be placed above the gear unit 14, and therefore, does not require additional axial space as would a one-way device.

The invention is to be limited only by the following claims.

We claim:

1. A friction device comprising a series of friction elements, reaction means acting on the friction elements in one direction, and energizing means urging the friction elements in the opposite direction and towards the reaction means operative in response to the torque of a friction element to engage the friction device sufficiently to self-sustain the torque and thereby rendering the friction device capable of sustaining all said torque.

2. A friction device comprising a series of friction elements, reaction means disposed on one side of the friction elements and so arranged as to act on the friction elements in one direction, self-energizing camming means disposed on the other side of the friction elements and operative in response to the torque of one friction element to urge the friction elements into engagement and towards the reaction means thereby rendering the friction device capable of sustaining all said torque.

3. A friction device comprising a series of friction elements; reaction means moving the friction elements in one direction from an inoperative to an operative position; and energizing means urging the friction elements into engagement with each other and the reaction means thereby rendering the friction device capable of sustaining torque only when the reaction means is in said operative position; the energizing means including a stationary member and a movable member, the members being so arranged that upon initiation of torque assumption by the device, the movable member is urged in the direction causing the friction elements to be moved toward the reaction means.

4. In a friction device; the combination of a series of friction elements so arranged as to be movable relative to each other; reaction means urging the friction elements in one direction between an inoperative and an operative position; energizing means urging the friction elements towards the reaction means thereby rendering the friction device effective to sustain torque when the reaction means is in said operative position; the energizing means including a stationary member, a movable member, the members having aligned cam surfaces, and a cam element associated with the cam surfaces and so arranged that upon initiation of torque assumption by the device the movable member is urged in the direction causing the friction elements to be moved to engage the reaction means in said operative position but incapable of engaging said reaction means in said inoperative position.

5. In a friction device, the combination of friction elements arranged for movement relative to each other, reaction means acting on the friction elements in one direction, energizing means urging the friction elements in the opposite direction and toward the reaction means operative to render the friction device capable of self-sustaining torque, and means initiating operation of the energizing means and operative with the friction device to self-sustain the full torque without slip.

6. In a friction device, the combination of friction elements, reaction means acting on the friction elements in one direction, self-energizing means urging the friction elements in the opposite direction and toward the reaction means so as to render the friction device capable of self-sustaining torque, and means initially rendering the energizing means effective so that the energizing means thereafter becomes self-sustaining to self-sustain the full torque without slip.

7. A friction device comprising a series of friction elements; reaction means acting on the friction elements in one direction; energizing means urging the friction elements toward the reaction means thereby rendering the friction device capable of sustaining torque; the energizing means including a stationary member and a movable member, the members being so arranged that upon initiation of torque assumption by the device the movable member is urged in the direction causing the friction elements to be moved toward the reaction means and complete the engagement of the device; and means initiating movement of the movable member so as to render the energizing means effective to self-sustain full torque.

8. In a friction device; the combination of a series of friction elements so arranged as to be movable relative to each other; reaction means urging the friction elements from an inoperative to an operative position; energizing means urging the friction elements toward the reaction means in the operative position thereby rendering the friction device capable of sustaining torque and incapable of sustaining torque when the reaction means is in the inoperative position; the energizing means including a stationary member, a movable member, the members having aligned pockets, and a cam element associated with the pockets and so arranged that upon initiation of torque assumption by the device the movable member is urged in the direction causing the friction elements to be moved toward the reaction means and complete the engagement of the device; and means initiating movement of the movable member so as to render the cam element effective.

9. In a friction device; the combination of a series of friction disks; reaction means including a fluid pressure operated piston member adapted to impart axial movement of the friction disks in one direction from an inoperative to an operative position; energizing means urging the friction disks toward the reaction means in the operative position thereby rendering the friction device capable of sustaining torque and incapable of sustaining torque when the reaction means is in the inoperative position; the self-energizing means including a stationary member, an axially movable member, the members having circumferentially aligned pockets and a ball cam element within the pockets adapted to cause the movable member to urge the friction disks toward the reaction means upon initiation of torque assumption by the device and complete the engagement of the device; and fluid pressure operated means initiating movement of the movable member so as to render the cam element effective and thereby cause the energizing means to become self-sustaining.

10. In a transmission; the combination of means for transferring drive through the transmission; ratio establishing devices for the drive transferring means; a fluid pressure system including a source of fluid pressure, one of the ratio establishing devices including a series of friction disks, reaction piston means arranged to be connected to the fluid pressure source so as to urge the friction disks in one direction when the transmission is operative, energizing means urging the friction disks toward the reaction piston means so as to render said one device capable of sustaining torque, and means initiating operation of the energizing means in one of the drive ratios.

11. In a transmission; the combination of means transferring drive through the transmission in different ratios; ratio varying devices for the drive transferring means; a fluid pressure system including a source of fluid pressure, a selector valve, and a shift valve, one of the ratio varying devices including a series of friction elements, reaction piston means urging the friction disks in one direction when connected to the pressure source by the selector valve, energizing means urging the friction disks towards the reaction piston means so as to render said one device capable of sustaining torque, the energizing means including a stationary member, a movable member, the members being so arranged that upon initiation of torque assumption by said one device the movable member is urged in the direction causing the friction elements to be moved toward the reaction means and complete the engagement of said one device, and fluid pressure operated means initiating movement of the movable member so as to render the energizing means effective, the fluid pressure operated means being connected to the fluid pressure source by the shift valve in one of the drive ratios.

12. In a vehicle transmission; the combination of means transferring drive through the transmission in different ratios; ratio varying devices for the drive transferring means; a fluid pressure system including a source of fluid pressure, a selector valve and a shift valve; one of the ratio varying devices including a series of friction disks, reaction piston means urging the friction disks in one direction when connected to the fluid pressure source by the selector valve, self-energizing means urging the friction disks toward the piston means, the energizing means including a stationary member, a movable member, the members having circumferentially aligned pockets, and a ball cam element within the pockets adapted to cause the movable member to urge the friction disks toward the reaction means upon initiation of torque transmission by said one device and complete the engagement of the device, and fluid pressure operated means initiating movement of the movable member so as to render the cam element effective and thereby cause the energizing means to become self-sustaining, the fluid pressure operated means being connected to the fluid pressure source by the shift valve in one of the drive ratios.

13. A friction device comprising a friction element, reaction means acting on the friction element in one direction, and energizing means operative in response to applied torque urging the friction element in the opposite direction and towards the reaction means, the energizing means alone rendering the device capable of sustaining the full applied torque.

14. In a drive sustaining device the combination of energizing means for frictionally engaging the device and being arranged so as to alone render the device capable of sustaining an applied torque in only one direction, and means initiating operation of the energizing means also rendering the device capable of sustaining torque in both directions.

15. In a friction device the combination of engaging means and deactivating means, said engaging means including an initiating means and a sustaining means, said deactivating means movable between an active position and a deactivating position, said engaging means operative to engage and disengage said device when said deactivating means is in said active position, and said engaging means being inoperative to engage said device when said deactivating means is in said deactivating position.

16. The invention defined in claim 15 and said sustaining means providing a self-energizing engaging force alone rendering the device capable of sustaining the full applied torque.

17. The invention defined in claim 15 and said friction device having a pair of friction elements, said engaging means moving one friction element and said deactivating means moving the other friction element.

18. In combination, energizing means including a pair of races, the races each having a recess formed therein and being so positioned that the recesses are aligned with each other, a cam element positioned within the recesses, the recesses being so arranged that the energizing means affords full energization thereby enabling the energizing means to sustain full torque applied in a given direction to one of the races due to the camming action alone between the recesses and the cam element.

19. In combination, energizing means including a pair of races, the races each having a recess formed therein and being so positioned that the recesses are aligned with each other, a cam element positioned within the recesses, the recesses being so arranged that each has a cam angle approximately equal to the self-energizing angle for the energizing means to thereby afford full energization so as to render the energizing means capable to sustain torque applied in only one given direction to one of the races due to the camming action alone between the recesses and the cam element.

20. In combination, energizing means including a pair of races, the races each having a recess formed therein and being so positioned that the recesses are aligned with each other, a cam element positioned within the recesses, the recesses being so arranged that the cam angles thereof render the energizing means capable of affording full energization thereby enabling the energizing means to sustain torque applied in a given direction to one of the races due to the camming action alone between the recesses and the cam element, and means initiating operation of the energizing means.

21. In combination, energizing means including a pair of races, the races each having a recess formed therein and being so positioned that the recesses are aligned with each other, a cam element positioned within the recesses, the recesses being so arranged that the energizing means affords full energization thereby enabling the energizing means to sustain torque applied in a given direction to one of the races due to the camming action alone between the recesses and the cam element, and means operative to initiate operation of the energizing means when torque is applied to one of the races and thereafter becoming inoperative.

22. In combination, energizing means including a pair of races, the races each having a recess formed therein and being so positioned that the recesses are aligned with each other, a cam element positioned within the recesses, the recesses being so arranged that the energizing means affords full energization thereby enabling the energizing means to sustain torque applied in only one given direction to one of the races due to the camming action alone between the recesses and the cam element, means initiating operation of the energizing means when torque is applied to one of the races, the initiating means also rendering the energizing means capable of sustaining torque in either direction.

23. In a drive sustaining device, the combination of energizing means for frictionally engaging the device, the energizing means including a pair of races each having a recess therein, a cam element positioned within each recess, the recesses both having a cam angle so formed thereon that the energizing means can cause the friction device to sustain an applied torque due to the camming action alone between the recesses and the cam element.

24. In a drive, a drive sustaining device operative in response to positive torque to provide a drive and negative torque to release the drive, the combination of energizing means for frictionally engaging the device, the energizing means including a pair of races each having a recess therein, a cam element positioned within each recess, the recesses both having a cam angle so formed thereon so that the energizing means can cause the friction device operating in response to positive torque to sustain an applied torque due to the camming action alone between the recesses and the cam element and operating in response to a negative torque to disable the camming action, and means initiating operation of the energizing means.

25. In a drive sustaining device, the combination of energizing means for frictionally engaging the device, the energizing means including a pair of races each having a recess therein, a cam element positioned within each recess, the recesses both having a cam angle so formed thereon so that the energizing means can cause the friction device to sustain an applied torque due to the camming action alone between the recesses and the cam element, and means initiating operation of the energizing means, the initiating means also rendering the energizing means capable of sustaining torque in either direction.

26. The invention defined in claim 1 and means operative while said energizing means is rendering the friction device capable of sustaining torque for disengaging said friction device.

27. The invention defined in claim 1 and said reaction means being movable from a first position in which said energizing means may engage said friction device to a second position in which said energizing means cannot engage said friction device, disabling means for moving said reaction means between said first and second positions.

28. The invention defined in claim 2 and means operative while said energizing means is rendering the friction device capable of sustaining torque for disengaging said friction device.

29. The invention defined in claim 2 and said reaction means being movable from a first position in which said energizing means may engage said friction device to a second position in which said energizing means cannot engage said friction device, disabling means for moving said reaction means between said first and second positions.

30. In a drive, a planetary gear unit having an input member, an output member and a reaction member exerting a large positive torque when held to establish the drive, a small negative torque during overrun and being released to disestablish the drive, friction brake means to hold the reaction member, selectively controlled brake apply means connected to said friction brake means to engage said friction brake to sustain a small positive and said small negative torque, self-energizing apply means connected to said brake means and said selectively controlled brake apply means operative in response to engagement of said selectively controlled brake apply means and said large positive torque to apply said brake means with a self-energizing brake apply force sufficiently to hold said reaction member and responsive to negative torque to disengage said self-energizing brake apply force.

31. The invention defined in claim 30 and further selectively controlled means to disable said self-energizing apply means.

References Cited by the Examiner
UNITED STATES PATENTS

| | | | |
|---|---|---|---|
| 838,024 | 12/06 | Hendricks | 188—82.84 |
| 2,230,520 | 2/41 | Wemp. | |
| 2,409,506 | 10/46 | McFarland. | |
| 2,595,860 | 5/52 | Lambert. | |
| 2,794,521 | 6/57 | Morrison. | |
| 2,854,098 | 9/58 | Griswold. | |
| 2,890,605 | 6/59 | Smirl. | |
| 2,992,705 | 7/61 | Chisnell et al. | |

DON A. WAITE, *Primary Examiner.*